United States Patent
Melvin

(10) Patent No.: US 10,710,357 B2
(45) Date of Patent: Jul. 14, 2020

(54) CLAMPING ASSEMBLY

(71) Applicant: Caterpillar Inc., Peoria, IL (US)

(72) Inventor: Ryan A. Melvin, New Braunfels, TX (US)

(73) Assignee: Caterpillar Inc., Peoria, IL (US)

( * ) Notice: Subject to any disclaimer, the term of this patent is extended or adjusted under 35 U.S.C. 154(b) by 677 days.

(21) Appl. No.: 15/352,671

(22) Filed: Nov. 16, 2016

(65) Prior Publication Data
US 2018/0134524 A1    May 17, 2018

(51) Int. Cl.
| | |
|---|---|
| *B25B 5/10* | (2006.01) |
| *B33Y 80/00* | (2015.01) |
| *F16B 2/10* | (2006.01) |
| *B33Y 10/00* | (2015.01) |
| *B33Y 50/02* | (2015.01) |
| *B66C 1/62* | (2006.01) |
| *B29C 64/386* | (2017.01) |
| *F16B 45/00* | (2006.01) |
| *F16B 21/14* | (2006.01) |
| *F16B 41/00* | (2006.01) |

(52) U.S. Cl.
CPC ............ *B33Y 80/00* (2014.12); *B29C 64/386* (2017.08); *B33Y 10/00* (2014.12); *B33Y 50/02* (2014.12); *B66C 1/62* (2013.01); *F16B 2/10* (2013.01); *F16B 41/002* (2013.01); *F16B 45/00* (2013.01); *F16B 2021/14* (2013.01)

(58) Field of Classification Search
USPC ............. 254/133 R; 269/221, 239, 258, 514; 81/57.16, 57.14, 57.19, 57.21
See application file for complete search history.

(56) References Cited

U.S. PATENT DOCUMENTS

| | | | | |
|---|---|---|---|---|
| 3,662,867 | A | * | 5/1972 | Kinzbach ................ E21B 17/06 188/67 |
| 4,979,356 | A | * | 12/1990 | Vatne .................... E21B 19/164 81/57.14 |
| 6,325,277 | B1 | * | 12/2001 | Collie .................. B23K 9/0286 228/212 |
| 7,896,178 | B2 | | 3/2011 | Davis |

(Continued)

FOREIGN PATENT DOCUMENTS

KR    20120011964    2/2012

*Primary Examiner* — Joseph J Hail
*Assistant Examiner* — Shantese L McDonald
(74) *Attorney, Agent, or Firm* — Harrity & Harrity LLP

(57) ABSTRACT

A clamping assembly for a component associated with an engine is illustrated. The clamping assembly includes a first support member and a second support member. The second support member is pivotally coupled to the first support member via a pivot point. The first and second support members define an internal space therebetween for receiving a portion of the component. The clamping assembly includes a first insert adapted to contact an inner surface of the first support member, and a second insert adapted to contact an inner surface of the second support member. The first and second inserts are also adapted to contact the portion of the component. The clamping assembly also includes a recess provided within the second insert. The recess is adapted to contact and align with a corresponding projection of the portion of the component. The clamping assembly further includes a handle extending from the first support member.

20 Claims, 9 Drawing Sheets

(56) References Cited

U.S. PATENT DOCUMENTS

2010/0187740 A1\* 7/2010 Orgeron .................. B25B 5/061
269/218
2010/0327507 A1\* 12/2010 Clark ........................ B25B 5/04
269/207
2015/0174706 A1\* 6/2015 McClure ............ B23K 37/0533
269/45

\* cited by examiner

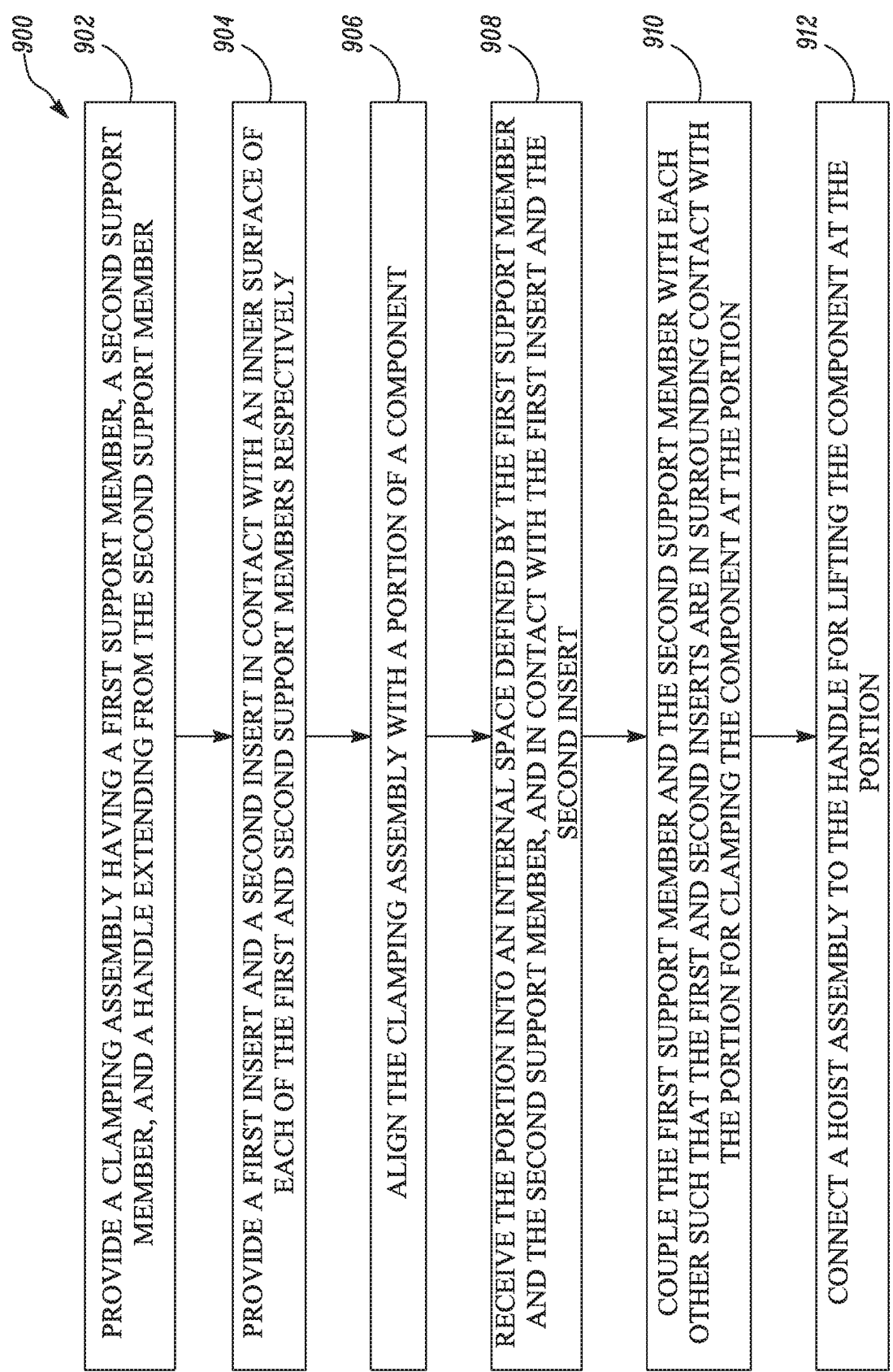

CLAMPING ASSEMBLY

TECHNICAL FIELD

The present disclosure relates to a clamping assembly. More particularly, the present disclosure relates to the clamping assembly for a component of an engine.

BACKGROUND

During assembly of an engine, various components of the engine may require lifting of the component in order to correctly align the component at a desired location, inclination, and so on with respect to the engine. Therefore, a lifting assembly having a number of tools, such as a hoist, one or more lifting belts, cables, and so on may be employed during the assembly process.

In some situations, the tools or the configuration of the component itself may cause hindrance or obstruction during the assembling of the component. For example, during lifting of the component, such as a turbocharger, lifting belts may have to be coupled on two opposing ends of the turbocharger such that the turbocharger may be balanced with minimum swinging motion during the lift. However, the ends of the turbocharger at which the lifting belts may be coupled, may have to be received within the engine for mounting of the turbocharger. As such, the lifting belts may cause hindrance during the assembly.

Hence, there is a need for an improved tool for lifting or mounting of such components that have configurations that work well with existing lifting assemblies.

SUMMARY OF THE DISCLOSURE

In an aspect of the present disclosure, a clamping assembly for a component associated with an engine is illustrated. The clamping assembly includes a first support member and a second support member. The second support member is pivotally coupled to the first support member via a pivot point. The first and second support members define an internal space therebetween for receiving a portion of the component. The clamping assembly includes a first insert adapted to contact an inner surface of the first support member and the portion of the component. The clamping assembly includes a second insert adapted to contact an inner surface of the second support member and the portion of the component. The clamping assembly also includes a recess provided within the second insert. The recess is adapted to contact and align with a corresponding projection of the portion of the component. The clamping assembly further includes a handle extending from the first support member.

In another aspect of the present disclosure, a method for lifting a component of an engine is provided. The method includes providing a clamping assembly having a first support member, a second support member, and a handle extending from the second support member. The method includes providing a first insert and a second insert in contact with an inner surface of each of the first and second support members respectively. The method includes aligning the clamping assembly with a portion of the component. The method includes receiving the portion of the component into an internal space defined by the first support member and the second support member, and in contact with the first insert and the second insert. The method also includes coupling the first support member and the second support member with each other such that the first and second inserts are in surrounding contact with the portion of the component for clamping the component at the portion. The method further includes connecting a hoist assembly to the handle for lifting the component at the portion.

In yet another aspect of the present disclosure, a lifting assembly for a component of an engine is provided. The lifting assembly includes a clamping assembly. The clamping assembly includes a first support member and a second support member. The second support member is pivotally coupled to the first support member via a pivot point. The first and second support members define an internal space therebetween for receiving a portion of the component. The clamping assembly includes a first insert adapted to contact an inner surface of the first support member and the portion of the component. The clamping assembly includes a second insert adapted to contact an inner surface of the second support member and the portion of the component. The clamping assembly also includes a recess provided within the second insert. The recess is adapted to contact and align with a corresponding projection of the portion of the component. The clamping assembly further includes a handle extending from the first support member. The lifting assembly also includes a hoist assembly coupled to the handle. The hoist assembly is adapted to exert a lifting force for lifting the component at the portion.

Other features and aspects of this disclosure will be apparent from the following description and the accompanying drawings.

BRIEF DESCRIPTION OF THE DRAWINGS

FIG. 9 is a flowchart illustrating a method for lifting the component of FIG. 1 with the clamping assembly of FIG. 2, according to one embodiment of the present disclosure.

DETAILED DESCRIPTION

Figure 1:
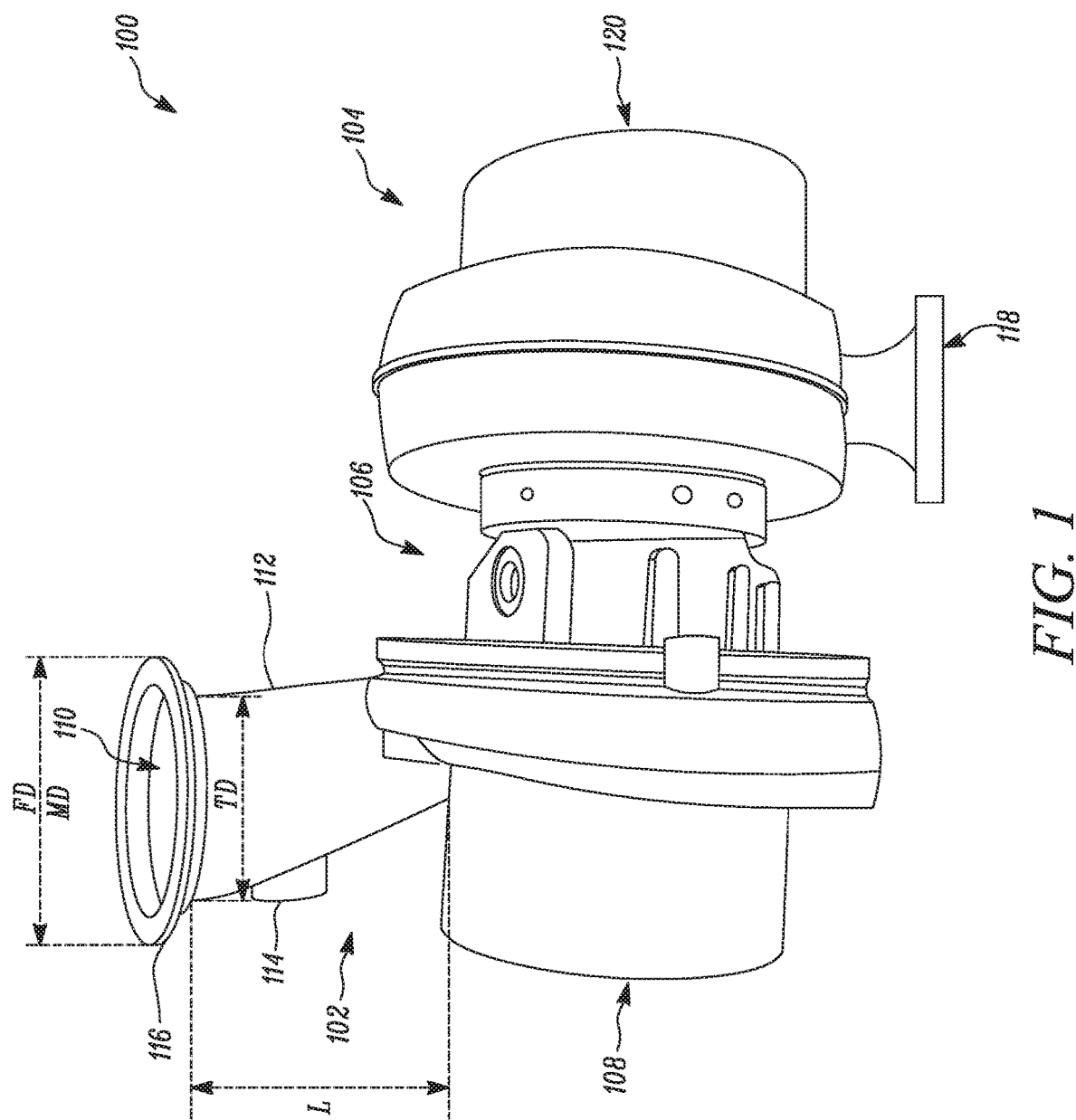
FIG. 1 is a perspective view of an exemplary component, according to one embodiment of the present disclosure.

Wherever possible, the same reference numbers will be used throughout the drawings to refer to the same or the like parts. Referring to FIG. 1 an exemplary component 100 is illustrated. The component 100 is associated with an engine (not shown). In the illustrated embodiment, the component 100 is a turbocharger. Accordingly, the component 100 includes a compressor section 102 and a turbine section 104. The compressor section 102 encloses various parts (not shown) of a compressor therein, such as an impeller, shaft, seals, bearings, and so on. The turbine section 104 encloses various parts (not shown) of a turbine therein, such as a set of blades, shaft, seals, bearings, and so on.

The component 100 also includes a coupling element 106 provided between the compressor section 102 and the turbine section 104. The coupling element 106 couples the compressor section 102 with respect to the turbine section 104 in order to form a single unit of the component 100. The component 100 also includes an inlet 108 and an outlet 110 provided on the compressor section 102. The inlet 108 provides an opening to receive a flow of air within the compressor section 102. The outlet 110 provides an opening for a flow of compressed air to exit the compressor section 102.

The compressor section 102 also includes a horn 112. The horn 112 is provided in fluid communication with the outlet 110. The horn 112 defines a tapering diameter "TD" along a length "L" thereof. The compressor section 102 also includes a projection 114 provided on the horn 112. The projection 114 includes a circular configuration and may vary based on application requirements. The projection 114 will be explained in more detail later. Further, the compressor section 102 includes a flange 116 provided on the horn 112. More specifically, the flange 116 is provided adjacent to the outlet 110. The flange 116 is adapted to couple the horn 112 with the engine. The flange 116 defines a flange diameter "FD" and may be interchangeably referred to as a maximum diameter "MD" of the horn 112.

Additionally, the component 100 includes an inlet 118 and an outlet 120 provided on the turbine section 104. The inlet 118 provides an opening to receive a flow of exhaust gas of the engine within the turbine section 104. The outlet 120 provides an opening for a flow of the exhaust gas to exit the turbine section 104. It should be noted that the component 100 described herein is merely exemplary and may vary based on application requirements. For example, the component 100 may be any other component including, but not limited to, a pump, and a blower. Also, the component 100 may be associated with the engine or any application other than the engine without limiting the scope of the disclosure.

Figure 2:
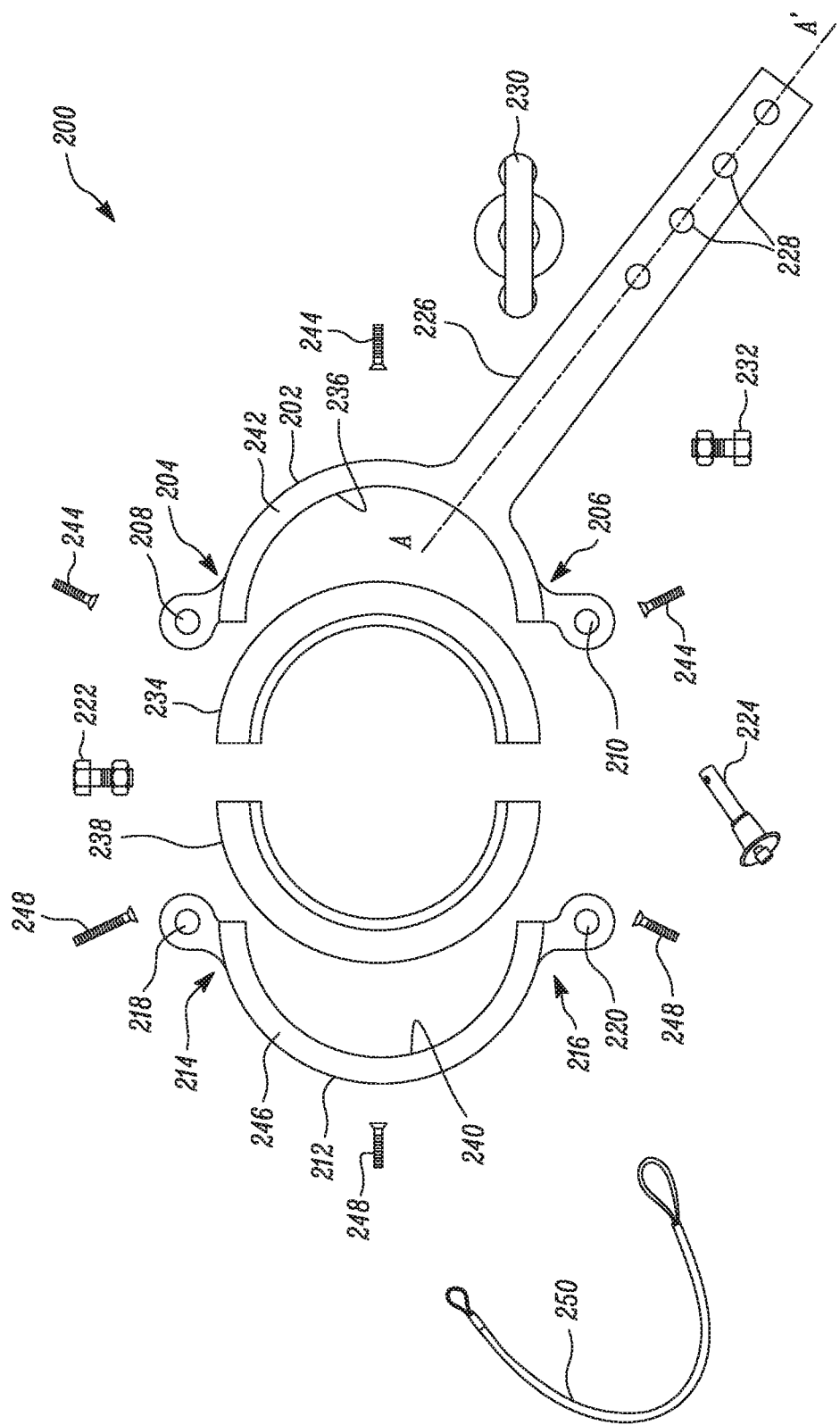
FIG. 2 is an exploded top view of a clamping assembly, according to one embodiment of the present disclosure.

The present disclosure relates to a clamping assembly 200 for lifting the component 100. Referring to FIG. 2, an exploded view of the clamping assembly 200 is illustrated. The clamping assembly 200 includes a first support member 202. In the illustrated embodiment, the first support member 202 includes a curved configuration. More specifically, the first support member 202 includes a semicircular configuration. In other embodiments, the first support member 202 may include any other configuration, such as a semi-oval configuration, an angled configuration, and so on, based on application requirements.

The first support member 202 also includes a first end 204 and a second end 206. The second end 206 is distal with respect to the first end 204. The first support member 202 includes a first hole 208 provided on the first end 204 thereof. The first support member 202 also includes a second hole 210 provided on the second end 206 thereof. The first hole 208 and the second hole 210 will be explained in more detail later.

The clamping assembly 200 includes a second support member 212. In the illustrated embodiment, the second support member 212 includes a curved configuration. More specifically, the second support member 212 includes a semicircular configuration. In other embodiments, the second support member 212 may include any other configuration, such as a semi-oval configuration, an angled configuration, and so on, based on application requirements.

The second support member 212 also includes a first end 214 and a second end 216. The second end 216 is distal with respect to the first end 214. The second support member 212 includes a third hole 218 provided on the first end 214 thereof. The second support member 212 also includes a fourth hole 220 provided on the second end 216 thereof. The third hole 218 and the fourth hole 220 will be explained in more detail later.

The clamping assembly 200 also includes a first fastening member 222 and a second fastening member 224. The first fastening member 222 is adapted to be received through the first hole 208 of the first support member 202 and the third hole 218 of the second support member 212, and will be explained in more detail later. The second fastening member 224 is adapted to be received through the second hole 210 of the first support member 202 and the fourth hole 220 of the second support member 212. The first fastening member 222 and the second fastening member 224 will be explained in more detail later.

The clamping assembly 200 includes a handle 226 extending from the first support member 202. More specifically, the handle 226 is provided adjacent to the second end 206 of the first support member 202. In other embodiments, the handle 226 may be provided on any location on the first support member 202 between the first end 204 and the second end 206 thereof. The handle 226 includes an elongated configuration. In the illustrated embodiment, the handle 226 is integral with respect to the first support member 202. In other embodiments, the handle 226 may be affixed to the first support member 202 using any known fastening methods, such as bolting, screw fitting, riveting, welding, and so on.

The handle 226 includes a number of apertures 228 provided thereon. The apertures 228 are provided along an axis A-A' of the handle 226. Each of the apertures 228 is provided in a spaced apart arrangement with respect to one another. The apertures 228 are adapted to receive a bracket 230. The bracket 230 is removably coupled to any one of the apertures 228 using a third fastening member 232. The third fastening member 232 may be any fastening element known in the art, such as a screw, a bolt, a pin, and so on. The bracket 230 is further adapted to receive a hook 702 (shown in FIG. 7) of a hoist assembly 704 (shown in FIG. 7) in order to couple the handle 226 and in turn the clamping assembly 200 to the hoist assembly 704.

The first support member 202, the second support member 212, and/or the handle 226 may be made of any metal known in the art. Also, the first support member 202, the second support member 212, and/or the handle 226 may be manufactured using any manufacturing method known in the art, such as casting, forging, fabrication, additive manufacturing, and so on, or a combination thereof.

The clamping assembly 200 also includes a first insert 234. The first insert 234 is provided in contact with an inner surface 236 of the first support member 202 extending between the first end 204 and the second end 206 thereof. The first insert 234 has a configuration similar to the configuration of the first support member 202. Accordingly, in the illustrated embodiment, the first insert 234 includes an arcuate configuration conforming to the curved configuration of the first support member 202. In other embodiments, the first insert 234 may include any other configuration based on the configuration of the first support member 202.

The clamping assembly 200 also includes a second insert 238. The second insert 238 is provided in contact with an inner surface 240 of the second support member 212 extending between the first end 214 and the second end 216 thereof. The second insert 238 has a configuration similar to the configuration of the second support member 212. Accordingly, in the illustrated embodiment, the second insert 238 includes an arcuate configuration conforming to the curved configuration of the second support member 212. In other embodiments, the second insert 238 may include any other configuration based on the configuration of the second support member 212.

Additionally or optionally, the clamping assembly 200 includes a lanyard 250. The lanyard 250 is coupled between the second support member 212 and the second fastening member 224. The lanyard 250 is coupled to the second support member 212 via any of the second fasteners 248 as shown with reference to FIG. 6. In other embodiments, the lanyard 250 may be coupled between the first support member 202 and the second fastening member 224. Accordingly, the lanyard 250 may be coupled to the first support member 202 via any of the first fasteners 244. The lanyard 250 provides to removably attach the second fastening member 224 to the clamping assembly 200 at all times.

Figure 3:
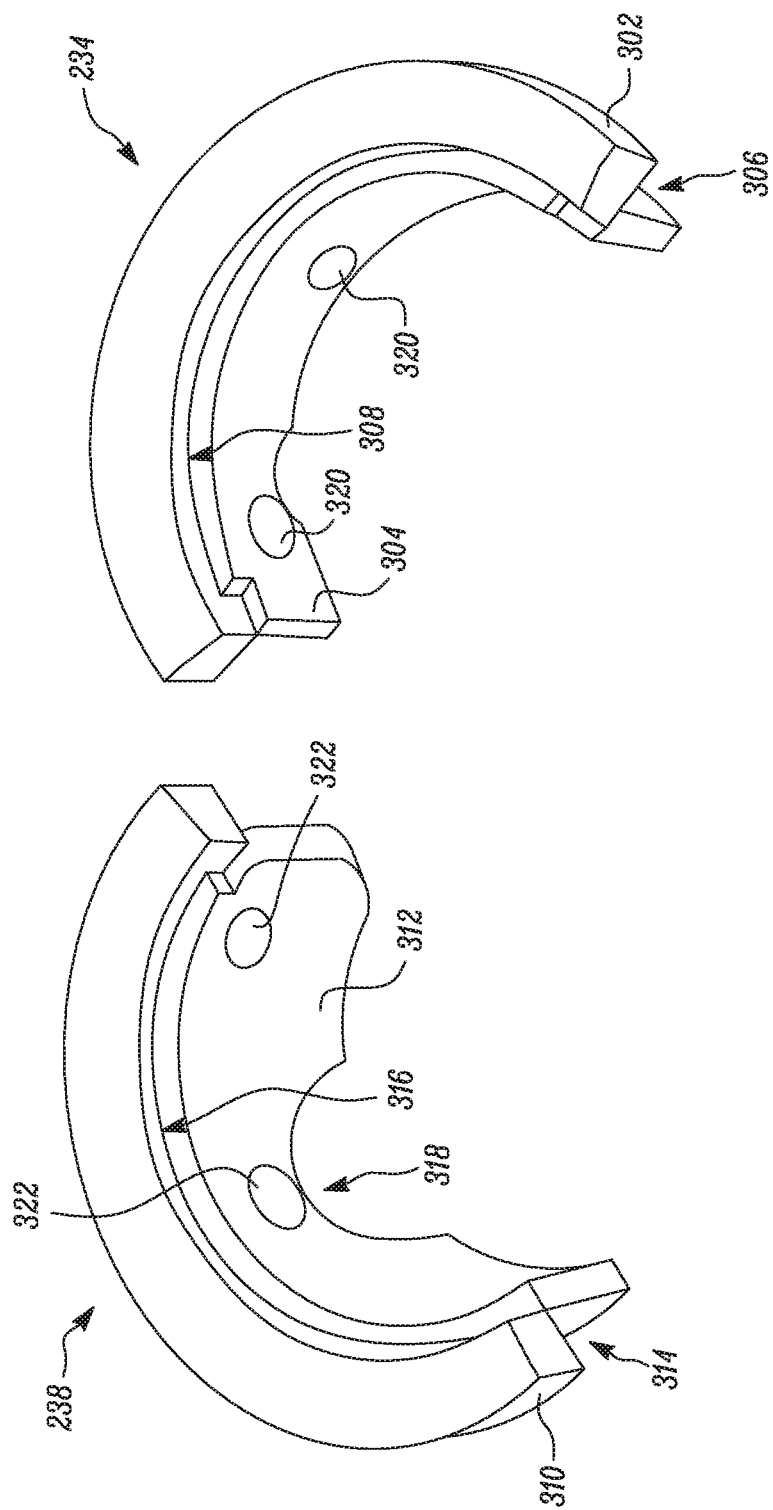
FIG. 3 is a perspective view of a first insert and a second insert of the clamping assembly of FIG. 2, according to one embodiment of the present disclosure.

Referring to FIG. 3, the first insert 234 includes an outer surface 302 and an inner surface 304. The inner surface 304 is disposed opposite the outer surface 302. The outer surface 302 includes a first outer stepped portion 306. The first outer stepped portion 306 receives the inner surface 236 of the first support member 202. Accordingly, a configuration of the first outer stepped portion 306 is similar to a configuration of the inner surface 236 of the first support member 202. In an assembled position of the first insert 234 with respect to the first support member 202 (shown in FIG. 4), the first insert 234 extends over the inner surface 236 and a top surface 242 (shown in FIG. 2) of the first support member 202 between the first end 204 and the second end 206 thereof.

The inner surface 304 includes a first inner stepped portion 308. The first inner stepped portion 308 receives a portion of the flange 116 of the component 100, during clamping of the component 100. Accordingly, a configuration of the first inner stepped portion 308 is similar to a configuration of the portion of the flange 116. The first insert 234 is coupled to the first support member 202 using a number of first fasteners 244 (shown in FIG. 2) through first bores 320. In the illustrated embodiment, the first insert 234 is coupled to the first support member 202 using three first fasteners 244. In other embodiments, the first insert 234 may be coupled to the first support member 202 using a single or multiple first fasteners 244 based on application requirements. The first fasteners 244 may be any fasteners known in the art, such as bolts, screws, rivets, and so on.

The second insert 238 includes an outer surface 310 and an inner surface 312. The inner surface 312 is disposed opposite the outer surface 310. The outer surface 310 includes a second outer stepped portion 314. The second outer stepped portion 314 receives the inner surface 240 of the second support member 212. Accordingly, a configuration of the second outer stepped portion 314 is similar to a configuration of the inner surface 240 of the second support member 212. In an assembled position of the second insert 238 with respect to the second support member 212 (shown in FIG. 4), the second insert 238 extends over the inner surface 240 and a top surface 246 (shown in FIG. 2) of the second support member 212 between the first end 214 and the second end 216 thereof.

The inner surface 312 includes a second inner stepped portion 316. The second inner stepped portion 316 receives a portion of the flange 116 of the component 100, during clamping of the component 100. Accordingly, a configuration of the second inner stepped portion 316 is similar to a configuration of the portion of the flange 116. The second insert 238 is coupled to the second support member 212 using a number of second fasteners 248 (shown in FIG. 2) through second bores 322. In the illustrated embodiment, the second insert 238 is coupled to the second support member 212 using three second fasteners 248. In other embodiments, the second insert 238 may be coupled to the second support member 212 using a single or multiple second fasteners 248 based on application requirements. The second fasteners 248 may be any fasteners known in the art, such as bolts, screws, rivets, and so on.

Figure 6:
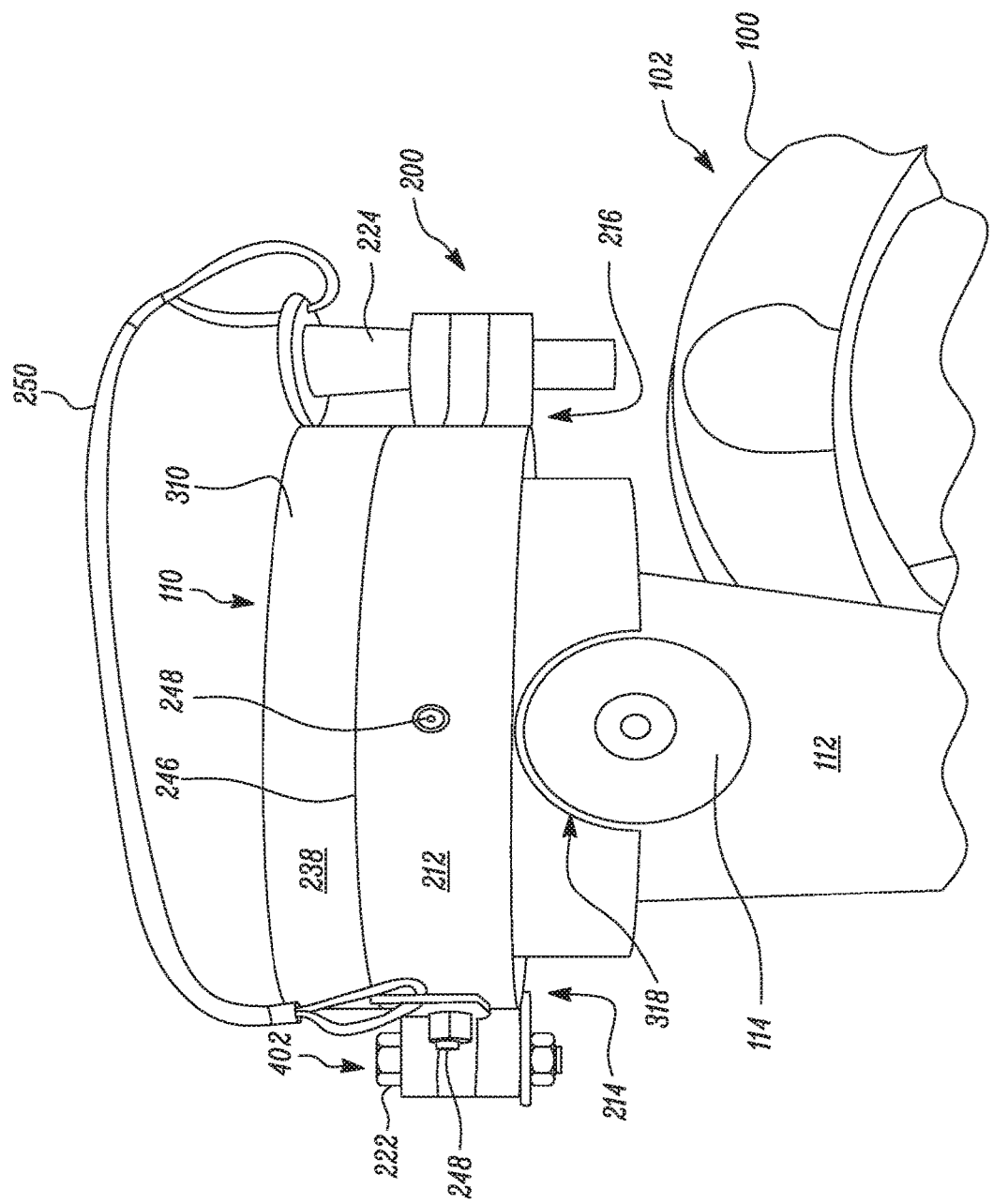
FIG. 6 is partial side view of the clamping assembly of FIG. 2 aligned on the component of FIG. 1, according to one embodiment of the present disclosure.

The second insert 238 also includes a recess 318 formed therein. The recess 318 extends at least part way along the outer surface 310 and the inner surface 312 of the second insert 238. Referring to FIG. 6, during the clamping operation, the recess 318 contacts and aligns with the projection 114 provided on the horn 112 of the component 100. In the illustrated embodiment, the recess 318 includes a semicircular configuration based on the circular configuration of the projection 114. In other embodiments, the recess 318 may include any other configuration based on the configuration of the projection 114.

In the illustrated embodiment, the first insert 234 and the second insert 238 are made of nylon. In other embodiments, the first insert 234 and the second insert 238 may be made of any material known the art including, but not limited to, a polymer and a metal. Also, in the illustrated embodiment, the first insert 234 and the second insert 238 are manufactured using additive manufacturing, such as Three Dimensional (3D) printing. In other embodiments, the first insert 234 and the second insert 238 may be manufactured using any conventional method, such as molding.

Figure 4:
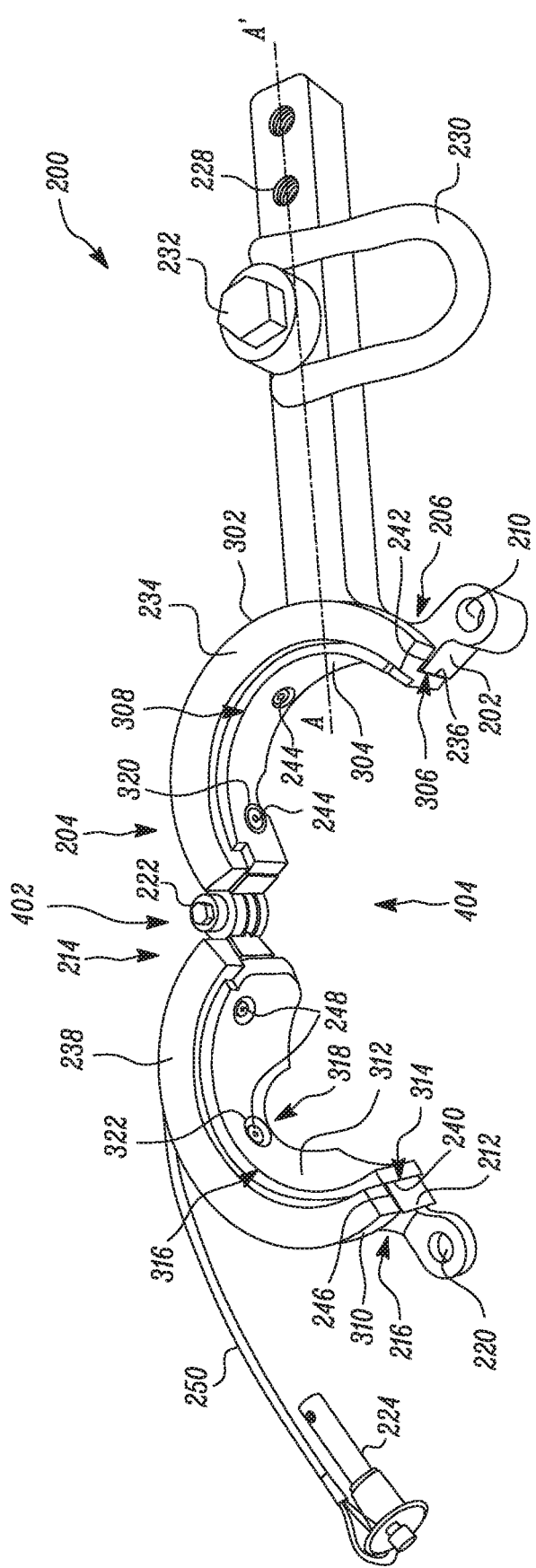
FIG. 4 is an assembled perspective view of the clamping assembly of FIG. 2 in an open position thereof, according to one embodiment of the present disclosure.

Referring to FIG. 4, the clamping assembly 200 in the assembled position is illustrated. Also, the clamping assembly 200 is shown in an open position thereof. During assembly, the first hole 208 of the first support member 202 is aligned with respect to the third hole 218 of the second support member 212. Further, the first fastening member 222 is provided through the aligned first hole 208 and the third hole 218. The first fastening member 222 may be any fastening element known in the art, such as a screw, a bolt, a rivet, a pin, and so on. Accordingly, the first hole 208 and the third hole 218 in association with the first fastening member 222 provide a pivot point 402. As such, the first support member 202 is pivotally coupled to the second support member 212 at the first ends 204, 214 thereof respectively via the pivot point 402.

In the assembled position, the first support member 202 and the second support member 212 define an internal space 404 therebetween. The internal space 404 receives a portion of the component 100 in order to clamp the portion. In the illustrated embodiment, the portion is the horn 112 provided on the compressor section 102 of the component 100. More specifically, the clamping assembly 200 is positioned around the horn 112 between the projection 114 and the flange 116. In other embodiments, the portion may be any other portion of the component 100, such as a horn (not shown) provided on the turbine section 104 of the component 100.

Figure 5:
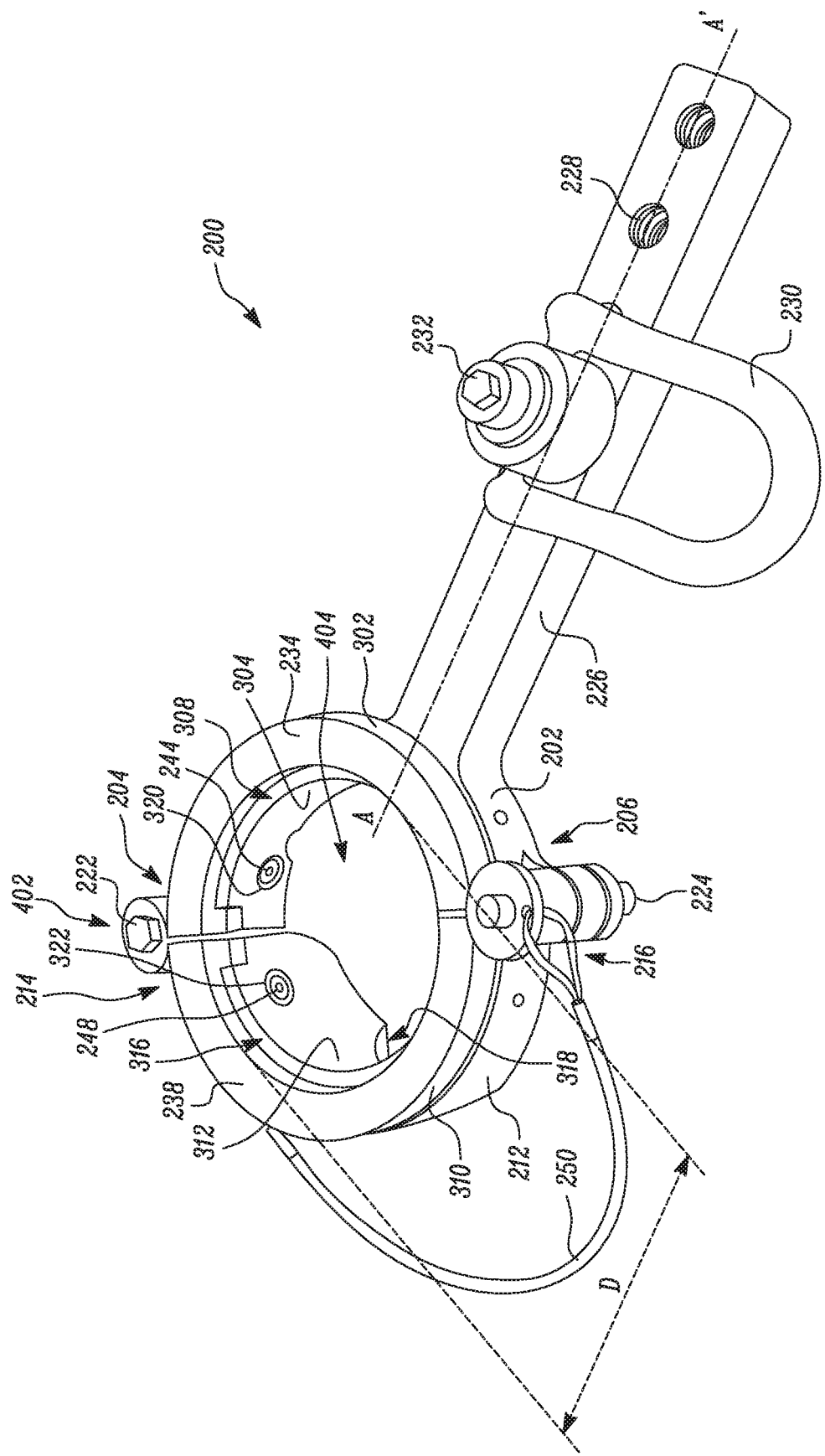
FIG. 5 is an assembled perspective view of the clamping assembly of FIG. 2 in a closed position thereof, according to one embodiment of the present disclosure.

Referring to FIG. 5, the clamping assembly 200 is shown in a closed position thereof. During operation, the first support member 202 and the second support member 212 are pivoted about the pivot point 402 in a manner such that the second hole 210 of the first support member 202 is aligned with respect to the fourth hole 220 of the second support member 212. Accordingly, the second hole 210 and the fourth hole 220 are positioned diametrically opposite to the pivot point 402 in the closed position of the clamping assembly 200.

Further, the second fastening member 224 is provided through the aligned second hole 210 and the fourth hole 220 in order to removably attach the first support member 202 and the second support member 212 with respect to one another. In the illustrated embodiment, the second fastening member 224 is a locking pin known in the art. In other embodiments, the second fastening member 224 may be any other fastening element, such as a screw, a bolt, and so on.

In the closed position, the internal space 404 of the clamping assembly 200 defines a diameter "D" thereof formed by the first insert 234 and second insert 238. The diameter "D" is based on and configured to align with the tapering diameter "TD" of the horn 112 of the component 100. More specifically, the diameter "D" of the internal space 404 is smaller than the maximum diameter "MD" of the horn 112 of the component 100. Accordingly, the clamping assembly 200 clamps around the horn 112 without slipping of the horn 112 through the internal space 404 during a lifting thereof.

Figure 7:
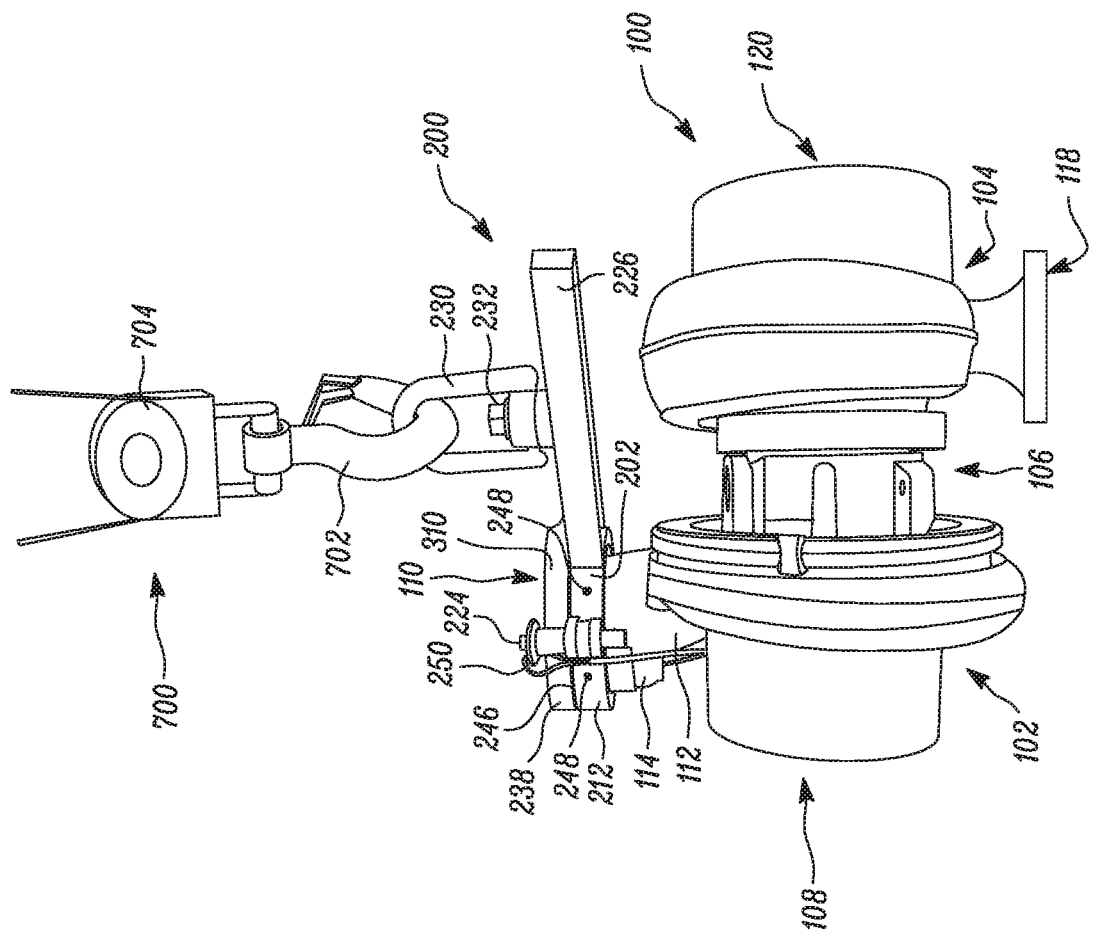
FIG. 7 is a perspective view of a lifting assembly, according to one embodiment of the present disclosure.

Referring to FIG. 7, a lifting assembly 700 for lifting the component 100 is illustrated. The lifting assembly 700 includes the clamping assembly 200 and the hoist assembly 704. The clamping assembly 200 is provided in surrounding contact around the horn 112 in the closed position thereof. More specifically, the clamping assembly 200 is positioned between the projection 114 and the flange 116. The clamping assembly 200 also includes the bracket 230 coupled to the handle 226 via one of the aperture 228. The bracket 230 is further coupled to the hoist assembly 704 via the hook 702. The hoist assembly 704 exerts a lifting force in order to lift the component 100 via the clamping assembly 200 at the horn 112.

INDUSTRIAL APPLICABILITY

The disclosed first insert 234 and the second insert 238 may be manufactured using conventional techniques such as, for example, casting or molding. Alternatively, the disclosed first insert 234 and the second insert 238 may be manufactured using conventional techniques generally referred to as the additive manufacturing or additive fabrication. Known additive manufacturing/fabrication processes include techniques such as, for example, 3D printing. 3D printing is a process wherein material may be deposited in successive layers under the control of a computer.

The computer controls additive fabrication equipment to deposit the successive layers according to a three dimensional model (e.g. a digital file such as an AMF or STL file) that is configured to be converted into a plurality of slices, for example substantially two dimensional slices, that each define a cross sectional layer of the first insert 234 and the second insert 238 in order to manufacture, or fabricate, the first insert 234 and the second insert 238. In one case, the disclosed first insert 234 and the second insert 238 would be an original component and the 3D printing process would be utilized to manufacture the first insert 234 and the second insert 238. In other cases, the 3D process could be used to replicate an existing first insert 234 and the second insert 238 and the replicated first insert 234 and the second insert 238 could be sold as aftermarket parts. These replicated aftermarket first insert 234 and the second insert 238 could be either exact copies of the original first insert 234 and the second insert 238 or pseudo copies differing in only non-critical aspects.

Figure 8:
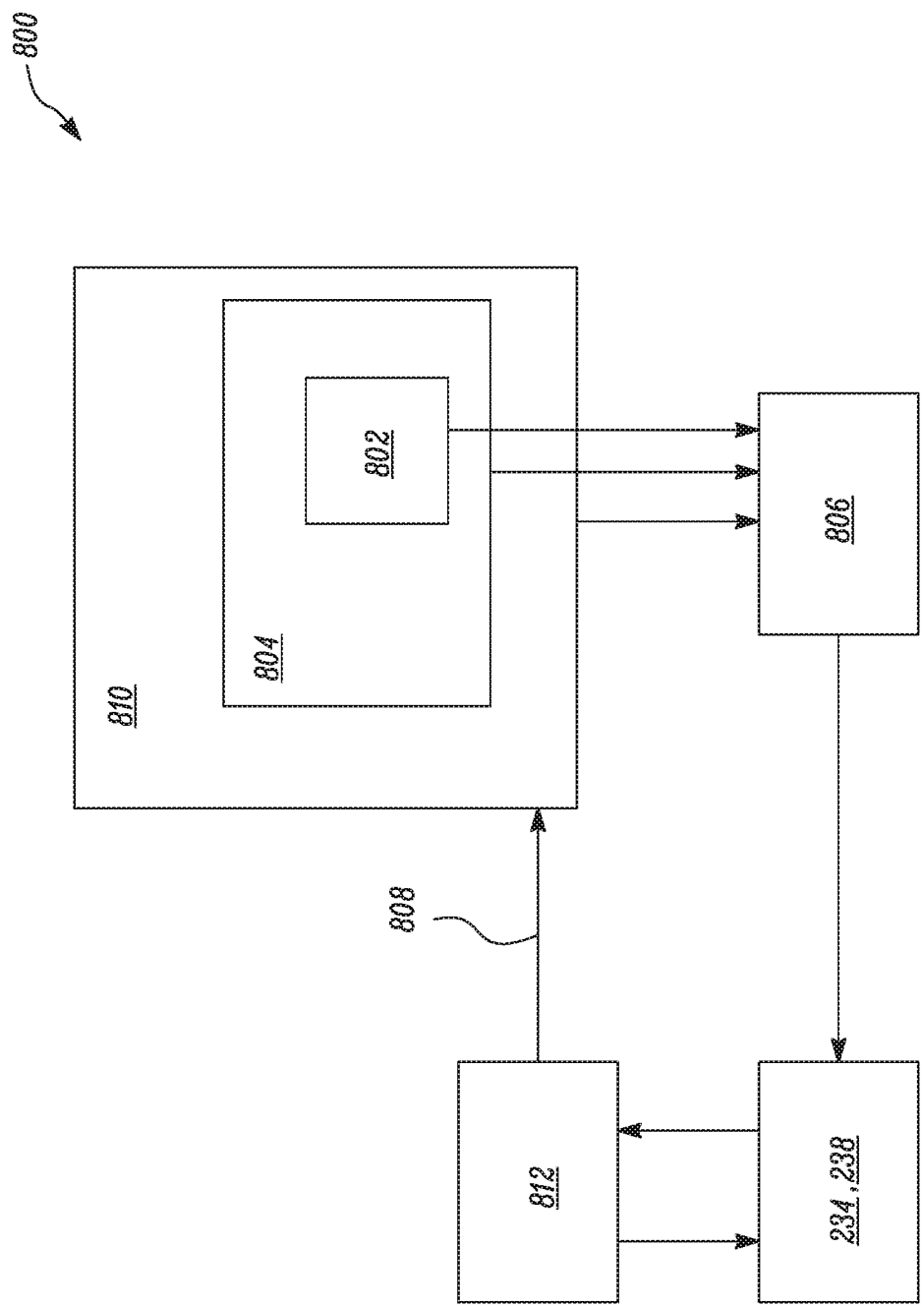
FIG. 8 is a schematic representation of a system for generating a three dimensional model of the first insert and the second insert of FIG. 3, according to one embodiment of the present disclosure.

With reference to FIG. 8, an exemplary additive manufacturing system 800 is illustrated. A three dimensional model 802 used to represent the original first insert 234 and the second insert 238 may be on a computer readable storage medium 804 such as, for example, a magnetic storage including a floppy disk, a hard disk, or a magnetic tape; a semiconductor storage such as a Solid State Disk (SSD) or a flash memory; an optical disc storage; a magneto optical disc storage; or any other type of physical memory on which information or data readable by at least one processor may be stored.

This computer readable storage medium 804 may be used in connection with commercially available 3D printers 806 to manufacture, or fabricate, the first insert 234 and the second insert 238. Alternatively, the three dimensional model 802 may be transmitted electronically to the 3D printer 806 in a streaming fashion without being permanently stored at the location of the 3D printer 806. In either case, the three dimensional model 802 constitutes a digital representation of the first insert 234 and the second insert 238 suitable for use in manufacturing the first insert 234 and the second insert 238.

The three dimensional model 802 may be formed in a number of known ways. In general, the three dimensional model 802 is created by inputting data 808 representing the first insert 234 and the second insert 238 to a computer or a processor 810 such as a cloud based software operating system. The data 808 may then be used as a three dimensional model 802 representing the physical first insert 234 and the second insert 238. The three dimensional model 802 is intended to be suitable for the purposes of manufacturing the first insert 234 and the second insert 238. In an exemplary embodiment, the three dimensional model 802 is suitable for the purpose of manufacturing the first insert 234 and the second insert 238 by an additive manufacturing technique.

In one embodiment depicted in FIG. 8, the inputting of data 808 may be achieved with a 3D scanner 812. The method may involve contacting the first insert 234 and the second insert 238 via a contacting and data receiving device and receiving data 808 from the contacting in order to generate the three dimensional model 802. For example, the 3D scanner 812 may be a contact type scanner. The scanned data 808 may be imported into a 3D modeling software program to prepare a digital data set. In one embodiment, the contacting may occur via direct physical contact using a coordinate measuring machine that measures the physical structure of the first insert 234 and the second insert 238 by contacting a probe with the surfaces of the first insert 234 and the second insert 238 in order to generate a three dimensional model 802.

In other embodiments, the 3D scanner 812 may be a non-contact type scanner and the method may include directing projected energy (e.g. light or ultrasonic) onto the first insert 234 and the second insert 238 to be replicated and receiving the reflected energy. From this reflected energy, a computer would generate the computer readable three dimensional model 802 for use in manufacturing the first insert 234 and the second insert 238. In various embodiments, multiple 2D images can be used to create the three dimensional model 802.

For example, 2D slices of a 3D object can be combined to create the three dimensional model 802. In lieu of the 3D scanner 812, the inputting of data 808 may be done using computer aided design (CAD) software. In this case, the three dimensional model 802 may be formed by generating a virtual 3D model of the disclosed first insert 234 and the second insert 238 using the CAD software. The three dimensional model 802 would be generated from the CAD virtual 3D model in order to manufacture the first insert 234 and the second insert 238.

The additive manufacturing process utilized to create the disclosed first insert 234 and the second insert 238 may involve materials such as plastic, rubber, metal, etc. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes.

The present disclosure also relates to a method 900 for lifting the component 100 of the engine. As an exemplary embodiment, the component 100 illustrated herein is the turbocharger associated with the engine. Referring to FIG. 9, a flowchart of the method 900 is illustrated. At step 902, the clamping assembly 200 is provided. The clamping assembly 200 includes the first support member 202, the second support member 212, and the handle 226 extending from the second support member 212. At step 904, the first insert 234 is provided in contact with the inner surface 236 of the first support member 202. Also, the second insert 238 is provided in contact with the inner surface 240 of the second support member 212.

At step 906, the clamping assembly 200 is aligned with the portion of the component 100, such as the horn 112 of the component 100. More specifically, the recess 318 formed on the second insert 238 is mated with the projection 114 on the horn 112 in order to align the clamping assembly 200 with the component 100. At step 908, the horn 112 is received into the internal space 404 defined by the first support member 202 and the second support member 212, and in contact with the first insert 234 and the second insert 238. More specifically, as shown in FIG. 4, the second support member 212 is pivoted with respect to the first support member 202 about the pivot point 402 in the open position in order to receive the horn 112 into the internal space 404.

At step 910, the first support member 202 and the second support member 212 are coupled with each other. More specifically, the first support member 202 and the second support member 212 are coupled to each other by passing the second fastening member 224, such as the locking pin, through the third hole 218 and the fourth hole 220 provided on the first second support member 212 and the second support member 212 respectively. Accordingly, the first insert 234 and the second insert 238 are in surrounding contact with the horn 112 in order to clamp the component 100 at the horn 112. At step 912, the hoist assembly 704 is connected to the handle 226 for lifting the component 100 at the portion. More specifically, the hoist assembly 704 is coupled to the bracket 230 via the hook 702 in order to lift the component 100 using the clamping assembly 200.

The clamping assembly 200 provides a simple and efficient tool in order to clamp and lift the component 100 at the portion thereof, such as the horn 112. Accordingly, the compressor section 102 and the turbine section 104 of the component 100 may be mounted on the engine without any hindrance around the inlet 108 and/or the outlet 120 thereof respectively. Also, the clamping of the component 100 around the horn 112 provides improved balance during lifting of the component 100 in turn providing ease of assembly.

The clamping assembly 200 includes the first insert 234 and the second insert 238 manufactured using additive manufacturing. As such, the first insert 234 and the second insert 238 may be manufactured for custom fit around the horn 112 based on varying dimensions and/or configuration of the horn 112. The first insert 234 and the second insert 238 also provide a wear surface between the horn 112, and the first support member 202 and the second support member 202. This in turn may limit wear of the first support member 202 and the second support member 212. The first insert 234 and the second insert 238 when worn out may be easily replaced with a new first insert 234 and a new second insert 238 respectively.

Further, the recess 318 provided on the second insert 238 allows positioning of the clamping assembly 200 around the horn 112 in a single alignment. The recess 318 provides a guiding element to an operator during the clamping operation in order to prevent incorrect and/or misalignment of the clamping assembly 200 with respect to the component 100. The clamping assembly 200 also includes the lanyard 250 in order to attach the second fastening member 224 with the clamping assembly 200 at all times.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A clamping assembly for a component associated with an engine, the clamping assembly comprising:
   a first support member;
   a second support member pivotally coupled to the first support member via a pivot point, wherein the first and second support members define an internal space therebetween for receiving a portion of the component;
   a first insert adapted to contact an inner surface of the first support member and the portion of the component;
   a second insert adapted to contact an inner surface of the second support member and the portion of the component;
   a recess provided within the second insert, the recess adapted to contact and align with a corresponding projection of the portion of the component,
      wherein the second insert includes an inner surface and an outer surface, and
      wherein the recess extends at least part way along and intersects the inner surface and the outer surface; and
   a handle extending from the first support member.

2. The clamping assembly of claim 1, wherein the handle further includes a plurality of apertures formed thereon, wherein any one of the plurality of apertures is adapted to be coupled with a hook of a hoist assembly.

3. The clamping assembly of claim 1, wherein the internal space has a circular configuration, and wherein a diameter of the internal space formed by the first and second inserts is configured to align with a tapering diameter of the portion of the component.

4. The clamping assembly of claim 3, wherein the diameter of the internal space is smaller than a maximum diameter of the portion of the component.

5. The clamping assembly of claim 1, wherein the recess has a semicircular configuration.

6. The clamping assembly of claim 1, wherein the first and second inserts are coupled to the first and second support members respectively using fasteners.

7. The clamping assembly of claim 1, wherein the first and second inserts have an arcuate configuration conforming to a curved configuration of the first and second support members respectively.

8. The clamping assembly of claim 1, wherein each of the first support member and the second support member includes a through hole provided thereon, and wherein a pin is adapted to be received into the through hole of the first and second support members for removably attaching the first and second support members with each other.

9. The clamping assembly of claim 8, wherein the through hole is provided at a location diametrically opposite to a location of the pivot point connecting the first and second support members.

10. The clamping assembly of claim 1, wherein the component is a turbocharger of an engine, and wherein the portion of the component is an outlet of the turbocharger.

11. The clamping assembly of claim 1,
wherein the first support member includes a first end and a second end, and
wherein the handle is extending from between the first end and the second end.

12. The clamping assembly of claim 1, wherein the handle includes one or more apertures that are coupled to a bracket.

13. The clamping assembly of claim 1, further comprising:
a bracket that is coupled to the handle and is adapted to receive a hook of a hoist assembly.

14. The clamping assembly of claim 1,
wherein the first insert includes one or more first bores, and
wherein the second insert includes one or more second bores.

15. The clamping assembly of claim 14,
wherein the first insert is coupled to the first support member using one or more first fasteners through the one or more first bores, and
wherein the second insert is coupled to the second support member using one or more second fasteners through the one or more second bores.

16. The clamping assembly of claim 14, further comprising:
a locking pin that is provided through a hole of the first support member and a hole of the second support member.

17. A clamping assembly for a component, the clamping assembly comprising:
a lanyard;
a first support member;
a second support member pivotally coupled to the first support member via a pivot point,
wherein the first support member and the second support member define an internal space therebetween for receiving a portion of the component, and
wherein the lanyard is coupled to the second support member and a fastening member to attach the fastening member to the clamping assembly;
a first insert adapted to contact an inner surface of the first support member and the portion of the component;
a second insert adapted to contact an inner surface of the second support member and the portion of the component;
a recess provided within the second insert, the recess adapted to contact and align with a corresponding projection of the portion of the component; and
a handle extending from the first support member.

18. The claiming assembly of claim 17, wherein the fastening member is a locking pin.

19. A clamping assembly for a component, the clamping assembly comprising:
a first support member;
a second support member pivotally coupled to the first support member via a pivot point, wherein the first and second support members define an internal space therebetween for receiving a portion of the component;
a first insert adapted to contact an inner surface of the first support member and the portion of the component,
wherein the first insert includes an inner surface, and
wherein the inner surface includes a stepped portion;
a second insert adapted to contact an inner surface of the second support member and the portion of the component;
a recess provided within the second insert, the recess adapted to contact and align with a corresponding projection of the portion of the component; and
a handle extending from the first support member.

20. The clamping assembly of claim 19,
wherein the second insert includes a different inner surface and an outer surface,
wherein the inner surface of the first insert is different from the different inner surface of the second insert, and
wherein the recess extends at least part way along the outer surface and the different inner surface.

* * * * *